United States Patent

Victoria et al.

[11] Patent Number: 6,061,907
[45] Date of Patent: May 16, 2000

[54] METHOD FOR MAKING A DIFFERENTIAL MECHANISM FOR AN AUTOMOTIVE VEHICLE

[75] Inventors: Alfred Balacan Victoria, Clinton Township; Kenneth H Goff, Jr.; Lawrence Jensen Budge, both of Plymouth; Joseph A. Szuba, Dearborn; Christian Peter Schmitz, Farmington Hills, all of Mich.

[73] Assignee: Ford Global Technologies, Inc., Dearborn, Mich.

[21] Appl. No.: 09/131,358

[22] Filed: Aug. 10, 1998

[51] Int. Cl.[7] .................................................. B21D 53/28
[52] U.S. Cl. ............................ 29/893.1; 29/463; 74/606; 74/607; 475/230
[58] Field of Search .................................. 29/893.1, 463; 74/606, 607; 475/230

[56] References Cited

U.S. PATENT DOCUMENTS 3,514,839  6/1970  Rodrigues ................................. 29/463
4,125,026  11/1978  Torii et al. .............................. 29/893.1
4,221,138  9/1980  Stewart et al. .
5,533,423  7/1996  Stehle et al. .

FOREIGN PATENT DOCUMENTS 18-10-520  11/1968  Germany .
26-53-978  11/1976  Germany .
28-44-918  10/1978  Germany .

Primary Examiner—P. W. Echols
Attorney, Agent, or Firm—Frank G. McKenzie

[57] ABSTRACT

A housing for differential mechanism is formed in two pieces using a cold flow-forming process. Each of the housing portions is formed with an internal hemispherical surface, and semi-circular recesses, which when aligned form circular recesses within which a pinion shaft is seated. A subassembly that includes the pinion shaft, pinion gears, side bevel gears, and a thin plastic liner surrounding the subassembly is located within a lower housing portion so that the pinion shaft is seated in the recesses. The upper housing portion is inserted within the upper portion and welded. A ring gear is joined to a housing portion.

10 Claims, 4 Drawing Sheets

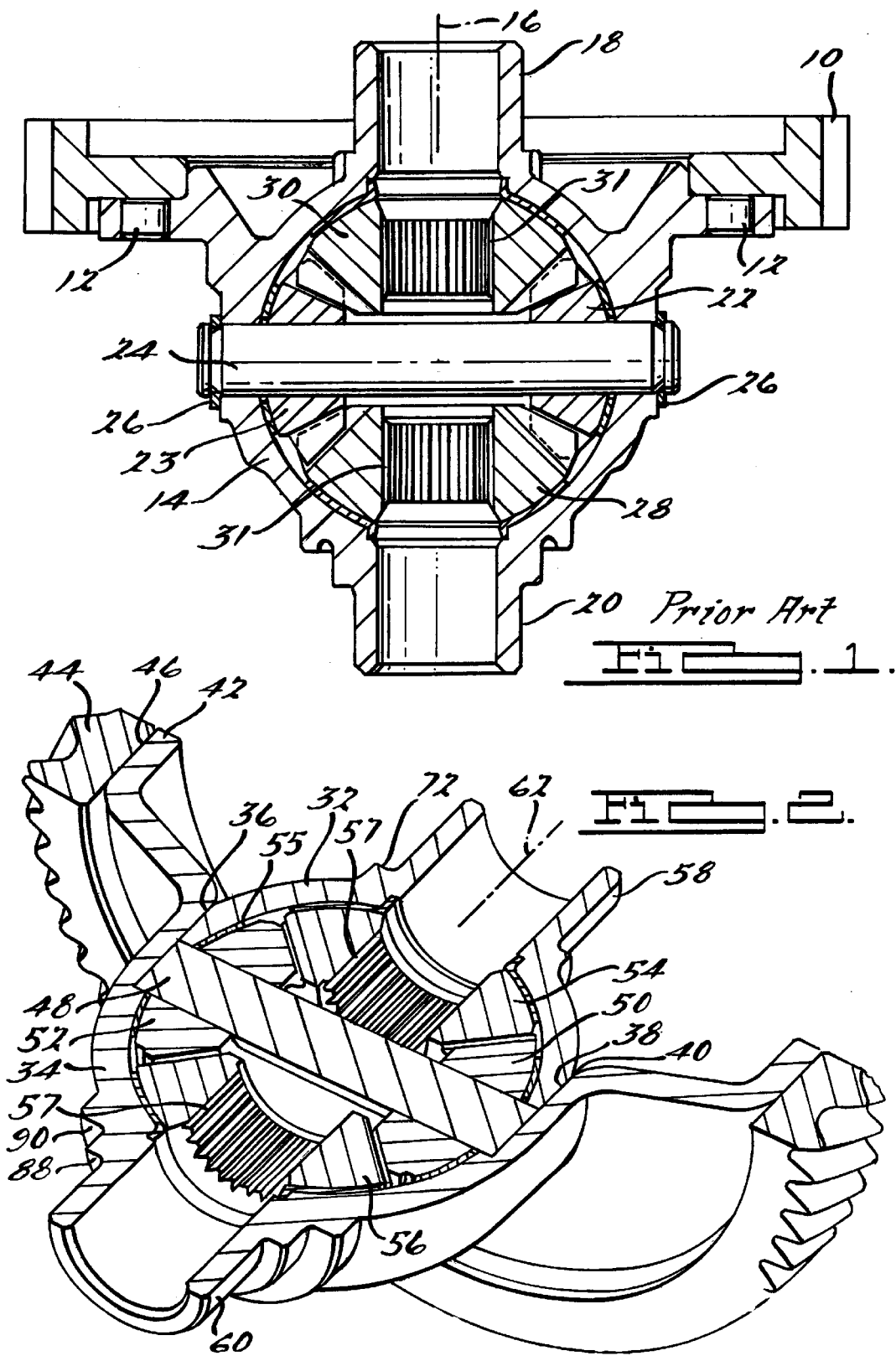

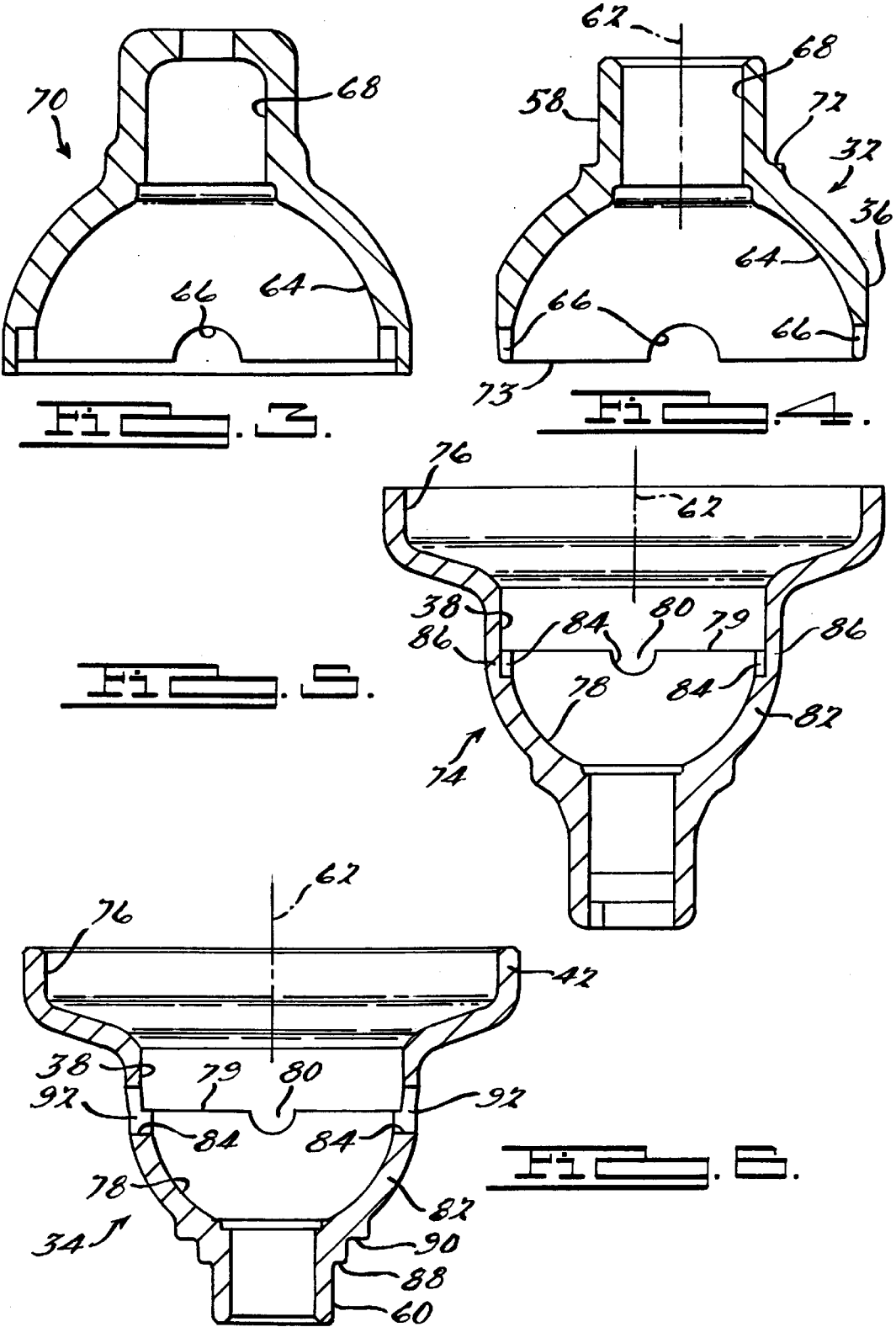

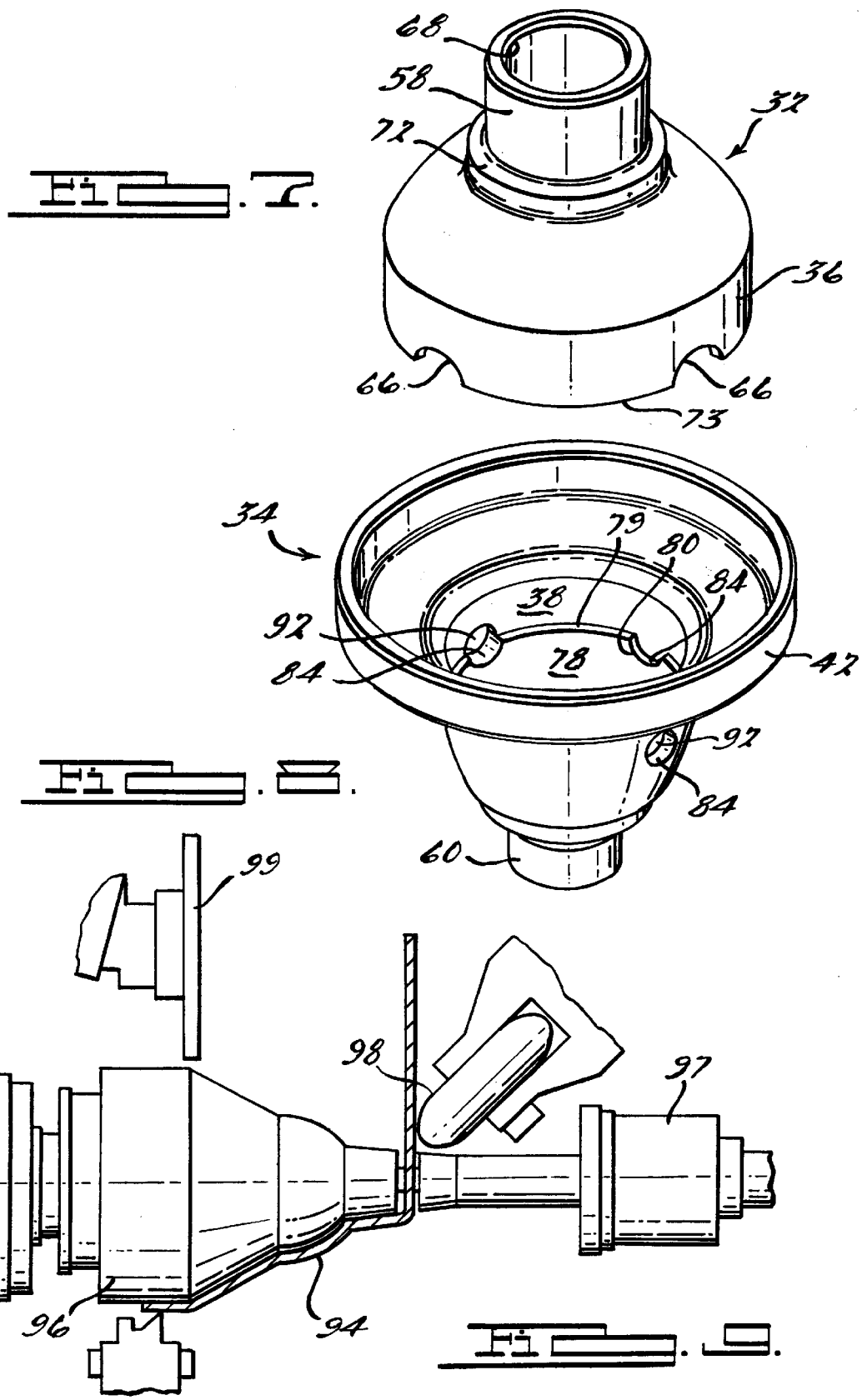

METHOD FOR MAKING A DIFFERENTIAL MECHANISM FOR AN AUTOMOTIVE VEHICLE

BACKGROUND OF THE INVENTION

1. Field of the Invention

This invention relates to a differential mechanism of the type used in axle differentials and those formed integrally with manual and automatic transmissions.

2. Description of the Prior Art

The basic function of a differential mechanism is to transmit torque from a transmission output to axle shafts, which allow the right and left driven wheels to rotate at different speeds. Various differential mechanisms have been developed, the simplest and most frequently used being the bevel gear differential.

A bevel gear differential consists of two or four pinion gears, depending on the weight of the vehicle and the magnitude of torque to be transmitted. The pinions, often called planetary gears, are supported together with the two side bevel gears in the differential housing or housing.

Torque is applied from the final drive of the transmission to a ring gear, for front wheel driven vehicles, or from the drive pinion to a crown wheel, for rear wheel driven vehicles. The ring gear and crown wheel are joined to the differential housing, from which rotation is transmitted to a pinion shaft that supports the pinions. The pinion gears distribute the applied torque equally to the side gears, which drive the axle shafts and the wheels. When the vehicle negotiates a turn, a speed difference between the inner and outer wheels occurs, causing the pinion gears to rotate. Because of this additional rotation, the speed of the outer wheel is increased to the same extent that the speed of the inner wheel decreases.

Conventional housings for differential mechanisms are made from a one-piece iron casting. Iron castings have significantly lower ductility and yield strength than most steels; therefore, they require thick walls to supplement their relatively low strength. The greater thickness produces increased weight and increases the moment of inertia, which reduces the efficiency of the powertrain. Frequently in conventional differential housings, two windows in laterally opposite walls are required to allow assembly of internal bevel gears and pinions. This arrangement limits the torque capacity of the housing due to the reduction in stiffness and strength caused by the presence of the windows.

Iron castings require a large number of machining operations to produce finished parts because the dimensions of the parts as cast cannot be controlled closely due to shrinkage during the transition from the liquid phase to the solid phase. Currently a conventional differential mechanism can only be assembled manually due to poor internal accessibility and the number of different joining axes. Machining requires an expensive, space-intensive transfer line having low flexibility.

Correct operation and vibration-free motion of the entire differential depends on accurate geometry of all matching components and stiff support of the gears by the differential housing. The differential housing not only carries the internal gears and ring gear or ground wheel, but also carries the differential bearings and, in many housings, the speedometer gear also. These components require different geometric features to ensure their accurate location support and centering.

Iron castings have several material and technology-related inefficiencies that limit their use in some differential housings. Ductility and yield strength of nodular cast iron are significantly lower than those of steel. Consequently they result in a heavier housing than would be required if the housing were of steel.

SUMMARY OF THE INVENTION

It is preferable to form a differential housing in two parts using flow forming techniques instead of casting the housing. Retention of the pinion shaft within the housing in slotted grooves or recesses, preferably recesses that are closed to the exterior of the housing, and permanently connecting the housing parts by welding or bonding rather than using fasteners results in a functionally superior, lower cost product.

A method, according to this invention, for making a differential mechanism assembly includes the steps of cold-working a first housing preform by one of a group consisting of spin-forming or flow-forming the inner surface of said preform into conformance with the contour of a first chuck, cold-working a second housing preform by one of a group consisting of spin-forming or flow-forming the inner surface of said preform into conformance with the contour of a second chuck, producing first and second housing portions by finish machining outer surfaces of the first and second housing preforms, respectively, pressing a ring gear onto a housing portion, installing a differential mechanism subassembly comprising a shaft, pinions and gears into a housing portion, inserting a portion of one member of a second group consisting of first and second housing portions into the other member of said second group, permanently connecting the ring gear and a housing portion, and permanently connecting the first and second housing portions mutually.

BRIEF DESCRIPTION OF THE DRAWINGS

FIG. 1 is a cross section of a conventional bevel gear differential mechanism.

FIG. 2 is a perspective view of a cross section through a central plane of a differential mechanism assembly according to the present invention.

FIG. 3 is a cross section of the preform upper differential housing before machining taken at a central lane.

FIG. 4 is a cross section of the lower differential housing after machining.

FIG. 5 is a cross section of the preform lower differential housing before machining taken at a central plane.

FIG. 6 is a cross section of the lower differential housing after machining.

FIGS. 7 and 8 are isometric views of the upper housing and lower housing portions, respectively.

FIG. 9 is a view of a differential housing preform being spin-formed or flow-formed.

DESCRIPTION OF THE PREFERRED EMBODIMENT

Figures 10, 11:
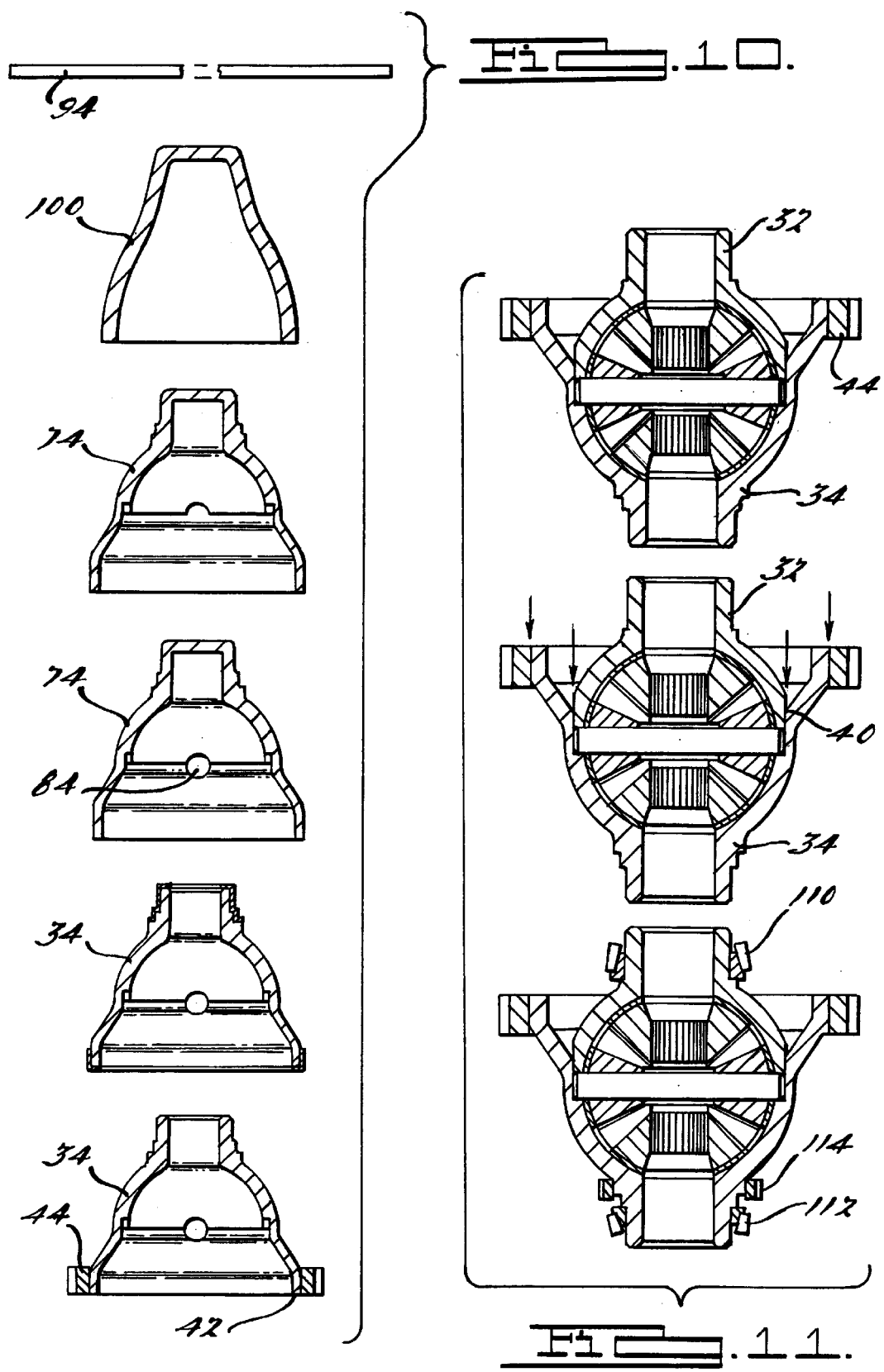
FIG. 10 is a series of sketches showing the steps of a method for manufacturing a lower differential housing portion.
FIG. 11 is a series of sketches showing the assembly steps of a differential mechanism.

Referring first to FIG. 1, in a conventional differential mechanism a ring gear 10, formed integrally with a ring gear wheel, is connected by bolted attachments 12 to a differential housing 14, the assembly supported for rotation about a central axis 16. The differential housing 14 is cast integrally with journals 18, 20 directed axially and providing a surface, on which friction bearings are located to support the assembly rotatably about axis 16. Located within the housing are two bevel pinions 22, 23 rotatably supported on a pinion shaft 24, whose position on the housing is fixed by retainer rings 26 elastically engaged in annular retainer ring recesses formed at each end of shaft 24 adjacent the outer surface of housing 14. Alternatively the pinion shaft can be retained in position on the housing by other suitable means than retaining rings. Side bevel gears 28,30 are in continuous meshing engagement with pinions 22, 23 and are each adapted for driveable connection by a spline 31 to axle shafts that extend outwardly from the differential housing through bores located in each journal.

The ring gear is driven from the power source and rotates pinion shaft 24 about central axis 16, thereby carrying pinions 22, 23 in rotation about the central axis. The axle shafts and side bevel gears 28, 30 are driven through engagement with the pinions.

The pinions and side gears are supported on the interior surface of the housing, which has a spherical contour, and the rear face of the gears and pinions are shaped accordingly. Alternatively, the side gears are supported in flat pockets or on flat shoulders, and the gear and pinion rear faces are also flat and located adjacent the planer surfaces of the pockets or shoulders. In another arrangement, the side gears are supported in flat pockets or on flat shoulders formed in the housing, and the rear faces of the pinions have a spherical contour like that of the adjacent inner surface of the housing.

FIG. 2 shows a differential mechanism assembly according to the present invention. The housing includes an upper housing portion 32 and a lower housing portion 34, each housing portion having a mutually adjacent surface 36, 38 where the housing portions are permanently joined mutually by a laser weld 40 located at the circular arc where surfaces 36, 38 terminate at the exterior of the housing portions. The lower housing portion 34 includes a flange 42 to which a ring gear 44 is joined preferably by a similar laser weldment located on the circular arc 46 where flange 42 and ring gear 44 contact mutually. FIG. 11 shows the preferred direction of the lasers that forms the weld. Alternatively, the laser welds can be replaced by chemical bonding using a high-strength polymer such as epoxy, or by other suitable means.

Flange 42 may be located on either portion 32 or 34. Flange 42 may be located axially at any appropriate position, such as aligned with the transverse axis of pinion shaft 48, in order to minimize bending of the housing.

Located within the space surrounded by housing portions 32, 34, are the pinion shaft 48, rotatably supporting bevel pinions 50, 52, which are in continual mutual engagement with side bevel gears 54, 56, respectively. The inner surface of side gears 54, 56 are formed with axially directed splines 57, each adapted for driveable engagement by an axle shaft. The centerline of pinion shaft 48 is coaxial with a transverse axis that is substantially perpendicular to central longitudinal axis 62.

In applications where the magnitude of torque transmitted through the differential mechanism is relatively high, three or four pinions, supported on the housing, meshing with the side bevel gears, and spaced mutually about the central axis, may be included in the assembly.

Housing portion 32 may be formed integrally with journal 58; portion 34 may be formed integrally with a corresponding journal 60. Alternatively, the journals 58, 60 may be formed apart from the housing portions 32, 34 and then welded to the housing assembly. The differential assembly is supported for rotation about the longitudial axis 62 on bearings fitted over the journals 58, 60.

FIG. 3 shows the upper differential housing preform 70, flow-formed or spin-formed as described below, having a wall 64 having a partial spherical inner surface, semi-circular recesses 66 spaced at equal angular positions about the central axis and extending through wall 64, and a circular cylindrical surface 68 on the inner surface of the bearing journal 58. Preferably none of the interior surfaces of either preform 70, 74 are machined but are formed instead by flow-forming or spin-forming a circular steel disc or stamped workpiece over a chuck whose outer surface determines the final shape, dimensions, and dimensional tolerances of the inner surfaces of the preforms 70, 74.

Certain exterior surfaces of the upper differential housing preform 70 are machined into the form of the upper housing portion 32 shown in FIG. 4. A comparison of FIGS. 3 and 4 indicates that cylindrical surface 36, shoulder 72, journal 58 and material at the axially inner extremity are machined from preform 70. Upper housing 32 has a circular surface 73 concentric with axis 62 but interrupted by semi-circular recesses 66.

FIG. 5 shows the lower differential housing preform 74 that is spin-formed or flow-formed, and FIG. 6 shows that preform after machining. Referring first to FIG. 5, substantially the entire internal surface of preform 74 is identical to the final form of the lower housing 34 including cylindrical surface 76, hemispherical surface 78, shoulder 79, cylindrical surface 38, and semi-circular recesses 80, spaced angularly about the axis 62 at diametrically opposite sides of a transverse axis. Each recess 80 extends partially through the thickness of wall 82, forming at each recess location a semicircular cylindrical surface 84, each recess closed at its radially outer extremity by the remaining portion 86 of wall 82. When assembled, each axial end of pinion shaft 48 is located in a circular cylindrical recess defined by semicircular cylindrical recesses 66, 80 on housing portions 32, 34 respectively.

Referring now to FIG. 6, external surfaces including journal 60, on which the bearings are fitted, the adjacent shoulder 88, shoulder 90 where the speedo-water meter gear is installed, and the outer surface of flange 42 are machined into preform 74. Internal surfaces are not machined.

Lubrication holes 92 may be pierced, drilled or laser cut entirely through the thickness of wall 82, preferably at such mutually spaced locations that do not influence rotation of the gears, i.e., at locations other than at the rear face of the gears.

An alternative technique to that shown in FIG. 2 is available for locating a subassembly of gears, pinions and the pinion shaft in the housing. Instead of locating the pinion shaft 48 in blind recess pairs 66, 80, holes through the walls 64, 82 at the locations of recesses 80 can be formed. When this alternate is used, the axial ends of pinion shaft 48 protrude outside the housing at each side, as shown in FIG. 1. Each end of shaft 45 has a recess suited to receive a retaining ring, which is installed at the outer surface of the housing so that a retaining ring elastically engages and is seated in each recess.

During assembly of the differential mechanism, housing portions 32, 34 are correctly positioned for assembly when cylindrical surfaces 36, 38 are mutually adjacent and shoulders 73, 79 are mutually adjacent.

Spin-forming or flow-forming is a cold working operation particularly well suited to produce bowl-shaped parts, preferably rotatably symmetric parts. The workpiece is formed over a chuck by spinning rollers that can be profiled. Spin forming is an operation in which the material is plasticized by a combination of compression and tension forces applied to a workpiece by the rollers. Flow forming is an operation in which deformation is the result of compression force applied by the rollers to a workpiece. During forming, the workpiece material is plasticized, which minimizes springback and allows high dimensional accuracy. The outer contour of the chuck is imprinted very precisely into the inner surface of the part. The outer contour only is free formed by the spinning rollers. Therefore, it has a wavy surface quality on the outside. In order to remove the finished part from the chuck, an undercut can be formed using an expandable chuck.

In the case of spin forming, generally there is no deliberate change in wall thickness during the forming process. The starting workpiece is a sheet metal disc.

In the case of flow-forming, there is a deliberate change in wall thickness of the workpiece to that of the formed part. Locally increasing the wall thickness is helpful toward strengthening and stiffening the part as required by its operational loading and material properties. The starting workpiece is a tube or cup, which is parallel-sided or tapered. The preform is clamped against a spinning chuck, which is driven by a spindle. One or more spinning rollers apply radial force to the surface of the preform until the inner surfaces of the workpiece conforms to the external surfaces of the spinning chuck and acquires the required shape and dimensions.

FIG. 9 illustrates a process for forming the upper and lower housing preforms 70, 74 from a workpiece 94 over a rotating chuck 96 driven by a spindle 97. The material is plasticized by applying compression force to the workpiece by a set of forming rollers 98, 99. Preferably, the metal workpiece is either a sheet metal disc, a tube or a cup. Flow-forming provides for a variable wall thickness and permits the material of the workpiece to be thickened in areas where high operating stress would otherwise occur. The material of the workpiece can be reduced in areas of low stress in order to minimize weight. The process is substantially chipless and produces excellent internal dimensional accuracy and surface finish. It is flexible and is able to create integrated profiles and features.

Spin-forming or flow-forming increases the hardness of the workpiece approximately 10–15 units from its original condition, due to work hardening of the material that occurs during forming. In order to facilitate flow-forming, the housing can be locally annealed by induction heating if work hardening of the workpiece occurs.

FIG. 9 shows, in the area above the horizontal centerline of the rotating chuck 96, a disc blank 94 having its inner surface formed progressively into conformance with the outer contour of the rotating chuck as forming rollers 98, 99 move axially across the surface of the workpiece. Alternatively, the workpiece can be stamped from a disc blank into a cup-shaped form having parallel sides. Then the workpiece is flow-formed over the chuck as described above.

FIG. 10 shows a series of steps used to form the lower differential housing 32. A steel disc or blank 94 is stamped into the cup-shaped workpiece 100. Thereafter the part is fitted over a chuck 96 and is flow-formed into the shape of housing preform 74. Then, if desired, lubrication holes 84 are pierced, drilled or laser cut through the wall of the preform, as described above. Finally, the highlighted areas of the outer surface of the preform 74 are finished turned to final dimensions.

The manufacture of the upper differential housing is substantially the same as the steps shown with reference to FIG. 10 except that no lubrication holes are formed in the upper housing portion. The inner surface of the preforms are flow-formed and preferably require no machining thereafter.

Refer now to FIG. 11, which illustrates the method steps for assembling the differential mechanism. First, ring gear 44 is press-fitted over the outer machined surface of flange 42. Then, a subassembly, which includes pinion shaft 48, pinions 50, 52, side gears 54, 56 in mesh with the pinion gears, and a plastic liner 55 in the form of a partial spherical cover surrounding the pinion shaft and the exterior surfaces of the pinions and gears, is inserted within the lower housing portion 34 such that each end of the pinion shaft is seated within a semi-circular recess 80. After the subassembly is inserted within the lower housing portion 34, the housing portion 32 is fitted within the lower housing portion such that a semicircular recess 66 is located over each end of the pinion shaft, adjacent and aligned with a recess 80. When this is done, cylindrical surfaces 36 of the upper housing portion 32 are located within the lower housing portion 34 adjacent cylindrical surfaces 38.

Next, the ring gear is permanently connected to the flange of the upper housing portion preferably by a laser weld at the location indicated by the arrow A. The upper and lower housing portions 32, 34 are then permanently connected mutually by a laser weld at the circular weld line 40, represented by arrows B, located at the axially outer periphery adjacent surfaces 36, 38. Alternatively, the laser welds can be replaced by bonding using a high-strength polymer such as epoxy.

Next, a check is made of play and drag torque. Then a bearing cup 110 is fitted on journal 58 adjacent shoulder 72 on the upper housing portion 32, and bearing 112 is inserted over journal 60 adjacent shoulder 88 on the lower housing 34. A speedometer gear 114 is located on the outer surface of the lower housing portion adjacent shoulder 90.

The differential mechanism according to this invention includes a housing made of cold-formed parts that performs better and is manufactured more efficiently than the current, conventional housing of cast iron. The invention is applicable to manual transmissions, automatic transmissions and axle differentials. The circumferentially closed differential housing of this invention results in a constant circumferential stiffness that minimizes deflections between the final drive and ring gear during rotation, improves relative rolling motion between the gear teeth, and reduces noise, vibration and harshness.

The stamping and forming operations result in a lower cycle time than most machining operations, and increases the output of parts at lower variable cost. The housing of this invention simplifies the assembly of internal components and is susceptible to automated assembly.

Virtually all ductile materials can be cold spin-formed or flow-formed. Acceptable materials include unalloyed and low-alloy carbon steels, aluminum alloys, and non-ferrous metals such as titanium, copper, etc. Preferably the housing potions are of high-strength, low-alloy steel, i.e. one pass, cold rolled strip steel, HSLA annealed (SAE J1392, 050 XLF Substrate), available commercially from various steel producers, or another suitable steel. Significant material properties of the referenced steel include yield strength: 40 ksi minimum, 48 ksi typical; tensile strength: 50 ksi minimum; elongation (2"): 22 percent minimum.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A method for making a differential mechanism assembly for an automotive vehicle, comprising the steps of:

cold-working a first housing preform by one of a group consisting of spin-forming or flow-forming the inner surface of said preform into conformance with the contour of a first chuck;

cold-working a second housing preform by one member of a group consisting of spin-forming or flow-forming the inner surface of said preform into conformance with the contour of a second chuck;

producing first and second housing portions by finish machining outer surfaces of the first and second housing preforms, respectively;

pressing a ring gear onto a housing portion;

installing a differential mechanism subassembly comprising a shaft, pinions and gears into a housing portion;

inserting a portion of one member of a second group consisting of first and second housing portions into the other member of said second group;

connecting the ring gear and a housing portion; and connecting the first and second housing portions mutually.

2. The method of claim 1, further comprising:

stamping first and second housing preforms from metal blanks.

3. The method of claim 1, further comprising:

forming a lubrication hole through a wall of a first housing portion.

4. The method of claim 1, further comprising:

installing bearings on journals located on the first and second housing portions; and installing a speedometer gear on an external surface of a housing portion.

5. A method for making a differential mechanism assembly for an automotive vehicle, comprising the steps of:

forming a first chuck whose outer surface has the form of the inner surface of a first housing portion;

forming a second chuck whose outer surface has the form of the inner surface of a second housing portion;

mounting a first workpiece on the first chuck and rotating the first chuck and first workpiece about an axis;

mounting a second workpiece on the second chuck and rotating the second chuck and second workpiece about an axis;

applying an inwardly directed radial force to the outer surface of the first workpiece thereby forcing the inner surface of a workpiece into conformance with the contour of the first chuck;

applying an inwardly directed radial force to the outer surface of the second workpiece thereby forcing the inner surface of the second workpiece into conformance with the contour of the second chuck;

producing first and second housing portions by finish machining outer surfaces of the first and second housing preforms, respectively;

pressing a ring gear onto a housing portion;

installing a differential mechanism subassembly comprising a shaft, pinions and gears into a housing portion;

inserting a portion of one member of the group consisting of first and second housing portions into the other member of said group;

connecting the ring gear and a housing portion; and connecting the first and second housing portions mutually.

6. The method of claim 5, further comprising:

forming a lubrication hole through a wall of a housing portion.

7. The method of claim 5, further comprising:

installing bearings on journals located on the first and second housing portions; and installing a speedometer gear on an external surface a housing portion.

8. A method for making a differential mechanism assembly for an automotive vehicle, comprising the steps of:

cold-working a first housing preform by one of a group consisting of spin-forming or flow-forming the inner surface of said preform into conformance with the contour of a first chuck having first angularly spaced recesses and a first surface;

cold-working a second housing preform by one of the group consisting of spin-forming or flow-forming the inner surface of said preform into conformance with the contour of a second chuck having second angularly spaced recesses and a second surface;

producing first and second housing portions by finish machining outer surfaces of the first and second housing preforms, respectively;

pressing a ring gear onto a housing portion;

installing a differential mechanism subassembly comprising a shaft, pinions and gears into the first housing such that the shaft is partially located in the first recesses;

inserting the second housing portion into the first housing portion such that the shaft is partially located in the second recesses and the first and second surfaces are mutually adjacent;

connecting the ring gear and a housing portion; and connecting the first and second housing portions mutually at the first and second surfaces.

9. The method of claim 8, further comprising:

forming a lubrication hole through a wall of a first housing portion.

10. The method of claim 8, further comprising:

installing bearings on journals located on the first and second housing portions; and installing a speedometer gear on an external surface of a housing portion.

* * * * *